(12) United States Patent
Kelsey et al.

(10) Patent No.: US 6,684,342 B1
(45) Date of Patent: Jan. 27, 2004

(54) APPARATUS AND METHOD OF DYNAMIC AND DETERMINISTIC CHANGES IN CLOCK FREQUENCY FOR LOWER POWER CONSUMPTION WHILE MAINTAINING FAST INTERRUPT HANDLING

(75) Inventors: Nicholas J. Kelsey, Mountain View, CA (US); Kinyue Szeto, San Francisco, CA (US); Ravi Sharma, Santa Clara, CA (US)

(73) Assignee: Ubicom, Inc., Mountain View, CA (US)

( * ) Notice: Subject to any disclaimer, the term of this patent is extended or adjusted under 35 U.S.C. 154(b) by 602 days.

(21) Appl. No.: 09/730,977

(22) Filed: Dec. 5, 2000

Related U.S. Application Data

(60) Provisional application No. 60/213,745, filed on Jun. 22, 2000, and provisional application No. 60/250,781, filed on Dec. 1, 2000.

(51) Int. Cl.[7] .............................. G06F 1/08; G06F 1/32
(52) U.S. Cl. ..................................... 713/501; 713/322
(58) Field of Search ............................... 713/300, 320, 713/322, 500, 501, 600

(56) References Cited

U.S. PATENT DOCUMENTS

| | | | |
|---|---|---|---|
| 4,821,187 A | 4/1989 | Ueda et al. ................. 364/200 |
| 5,163,146 A | * 11/1992 | Antanaitis, Jr. et al. .... 713/501 |
| 5,247,636 A | * 9/1993 | Minnick et al. ............ 713/601 |
| 5,392,435 A | * 2/1995 | Masui et al. ................ 710/260 |
| 5,410,658 A | 4/1995 | Sawase et al. ............... 395/375 |
| 5,867,725 A | 2/1999 | Fung et al. ............. 395/800.23 |
| 5,944,816 A | 8/1999 | Dutton et al. ............... 712/215 |
| 6,378,018 B1 | * 4/2002 | Tsern et al. ................. 710/313 |

OTHER PUBLICATIONS

*8–bit AVR® Microcontroller with 128K Bytes In–System Programmable Flash—ATmega103/103L—Preliminary*; ATMEL; ©Atmel Corporation 2000; pp. 1–126.

Nemirovsky, Dr. Mario Daniel; Brewer, Dr. Forrest; and Wood, Dr. Roger C.; DISC: Dynamic Instruction Stream Computer; 1991; ACM; pp. 163–171.

* cited by examiner

*Primary Examiner*—Thomas M. Heckler
(74) *Attorney, Agent, or Firm*—Fenwick & West LLP

(57) ABSTRACT

An apparatus and method to provide a data processing system with reduced average power consumption while maintaining fast interrupt handling, and/or selectively change clock frequency for accessing memory with various access speeds. In a first embodiment, the invention provides a method to deterministically change a clock frequency between a first clock frequency and a second clock frequency in a data processing system to process operations upon the occurrence of a condition. In a second embodiment, the invention provides a method to change the clock frequency of a data processing system to process operations upon the occurrence of a condition. In a third embodiment, the invention provides a clock divider circuit to produce a core clock signal. In a fourth embodiment, the invention provides a data processing system with a deterministically variable processor clock.

30 Claims, 8 Drawing Sheets

APPARATUS AND METHOD OF DYNAMIC AND DETERMINISTIC CHANGES IN CLOCK FREQUENCY FOR LOWER POWER CONSUMPTION WHILE MAINTAINING FAST INTERRUPT HANDLING

RELATED APPLICATIONS

This application claims priority from U.S. provisional application No. 60/213,745 filed on Jun. 22, 2000, and U.S. provisional application No. 60/250,781, filed on Dec. 1, 2000 and titled "Embedded Internet Processor with 64 Kbyte (32 K×16) Flash Program Memory, 16 Kbyte (8 K×16) Program Ram, 4 K×8 Data RAM, In-System Programming Capability, and Debugging Features" which are all incorporated by reference herein in their entirety.

BACKGROUND OF THE INVENTION

1. Field of the Invention

This invention relates generally to changing the clock frequency in a data processing system, and in particular to deterministically changing the clock frequency in a data processing system to achieve lower power consumption while maintaining fast interrupt handling.

2. Background of the Invention

Data processing systems (e.g., Internet appliances, consumer electronics, computers, telecommunication systems, control systems, and so forth) typically operate a processor (e.g., a micro-controller, microprocessor, central processing unit, and so forth) at a fixed clock frequency. However, a higher clock frequency leads to higher power consumption. The peak performance required by the application determines the clock frequency of the processor. The performance has two components: (1) the frequency required so that the necessary instructions can be executed within the time allowed, and (2) the frequency required so the latency/response time limit is met after an event happens. The peak performance required thus determines the overall power consumption. The interrupt response time (due to the processor clock frequency and the code that it executes for the interrupt) is typically the determining factor for the peak performance. Even if a time-sensitive interrupt occurs occasionally, the processor must run at full speed (maximum power consumption) all the time to respond to the interrupt at any time.

However, low power consumption modes have been long desired. Many conventional data processing systems are implemented with an additional state for low power consumption. Low power consumption states are typically achieved by selectively turning off entire subsystems inside the processor or in the remaining data processing system. More specifically, low power consumption in present data processing systems is typically achieved by stopping the clock to the processor in the data processing system.

However, such a low power consumption state in most conventional systems imposes a considerable time delay for the processor to regain full speed data processing system functionality, which causes longer interrupt response times than would be the case if the processor clock were always present. Other conventional systems (e.g., the ATmega 103 (L) micro-controller made by Atmel Corporation, with corporate headquarters in San Jose, Calif.) either run the processor clock at full speed or turn it off completely, without the ability to selectively increase or decrease the clock frequency.

FIG. 1 is a circuit diagram of a clock structure 100, which illustrates two conventional methods to provide a low power consumption state. Clock structure 100 is comprised of a multiplexer (MUX) 116, and a glitch-free AND gate 128. The MUX 116 receives clock source 1 102 and clock source 2 104. MUX 116, based on a select signal 108, chooses either clock source 1 102 or clock source 2 104 to produce a system clock 118. System clock 118 is optionally tapped to provide clock signals 110 and 112 for one or more peripheral devices (e.g., timers and analog-to-digital converters). Glitch-free AND gate 128 receives enable signal 130 as an input signal, and produces core clock 132.

As discussed above, FIG. 1 illustrates two conventional methods. A first method selectively switches off the core clock 132 by using AND gate 128, with the advantage of low or zero overhead wakeup, and the disadvantage of providing one clock or no clock. A second method selectively switches between clock sources 102 and 104 by using MUX 116, with the advantage of choosing a clock source, and the disadvantage of taking a non-deterministic amount of time to switch between clock sources (i.e., the time to change to a new clock frequency depends on the cycle time of the old clock frequency). Present day data processing systems (e.g., using the clock generation circuit shown in FIG. 1) have a major problem with providing both low power consumption and quick handling of interrupts. Therefore, an alternative to stopping the clock to the processor and other subsystems in a data processing system is needed, that does not degrade the interrupt response time.

One fixed clock frequency for the processor, or for the data processing system, has another disadvantage. Present day data processing systems do not have the capability to increase or decrease the clock frequency according to the accessing time needed to access faster or slower memory (e.g., flash memory, or other types of non-volatile memory). For example, the processor typically services processes external to the processor (e.g., memory and I/O operations operating at slower clock frequencies), by executing processor instructions containing wait states (i.e., idle cycles) to provide enough delay time for the processor to correctly access slower memory.

Although higher clock frequencies do not facilitate these slower processes, a processor operating at higher clock frequencies is still desirable for interrupt handling. Furthermore, a change in the clock frequency over a period of many clock cycles, and/or with uncertainty in the clock transition, is also undesirable, since the data processing system can fail to operate correctly due to incorrectly-timed instruction execution. A clock change should be quick and deterministic (i.e., not depend on the old clock frequency).

What is needed is an improved implementation of clock generation in a data processing system to dynamically and deterministically increase or decrease the clock frequency as needed. Moreover, such an implementation should provide a relatively inexpensive data processing system (not significantly more expensive than a conventional data processing system) that appropriately changes the processor clock frequency for optimum performance in different circumstances (e.g., a low power mode, an interrupt mode, fast memory access mode, slow memory access mode, and other situations).

SUMMARY OF THE INVENTION

The present invention provides an improved implementation of clock generation in a data processing system to dynamically and deterministically increase or decrease the clock frequency as needed (e.g., to achieve low power consumption while maintaining fast interrupt response handling, or while accessing fast or slow memory).

The invention also provides a relatively inexpensive system that appropriately changes the processor clock frequency for optimum performance in different circumstances. The invention can be implemented in numerous ways, such as a method, a clock divider circuit, and a data processing system. Several aspects of the invention are described below.

In accordance with a first aspect of the invention, the invention provides a method to deterministically change a clock frequency between a first clock frequency and a second clock frequency in a data processing system to process operations upon the occurrence of a condition. The method includes configuring the first clock frequency to be used when processing operations in the data processing system when the condition is occurring; configuring the second clock frequency to be used when processing operations in the data processing system when the condition has not occurred; and changing the clock frequency to the first clock frequency to process the condition when the condition occurs.

In accordance with a second aspect of the invention, the invention provides a method to change the clock frequency of a data processing system to process operations upon the occurrence of a condition. The method includes configuring a first clock frequency to the clock frequency to process the condition in the data processing system when the condition is occurring; configuring a second clock frequency to the clock frequency to process operations in the data processing system when the condition has not occurred; changing the clock frequency to the first clock frequency to process the condition when the condition occurs; jumping to a condition service routine; executing the condition service routine at the first clock frequency; and testing for completion of the condition service routine.

In accordance with a third aspect of the invention, the invention provides a clock divider circuit to produce a core clock signal. The clock divider circuit includes a decoder, receiving a core clock divider value and producing a first and second output signal; a register receiving the first output signal from the decoder and producing an output signal; a control circuit receiving a plurality of inputs signals and producing an output signal; a counter receiving the output signal from the control circuit and producing an output signal; a comparator receiving the output from the register and the output signal from the counter and producing an output signal; a combinational logic circuit receiving the second output signal from the decoder and the output signal from the comparator; a clock doubling circuit receiving a clock input signal and producing a clock output signal; and a sequential logic circuit receiving the output signal from the combinational logic circuit and the output signal from the clock doubling circuit and producing the core clock signal In accordance with a fourth aspect of the invention, the invention provides a data processing system with a deterministically variable processor clock. The data processing system includes a processor receiving said deterministically variable processor clock; a memory accessible to the processor, containing information to be used by the processor, having a first portion with a relatively faster access and a second portion with a relatively slower access; and a clock structure to change the variable processor clock supplied to the processor from a first clock frequency to a second clock frequency.

These and other objects and advantages of the invention will become apparent to those skilled in the art from the following detailed description of the invention and the accompanying drawings.

BRIEF DESCRIPTION OF THE DRAWINGS

The foregoing and other objectives, aspects, and advantages will be better understood from the following detailed description of embodiments of the present invention with reference to the following drawings.

DETAILED DESCRIPTION OF THE PREFERRED EMBODIMENTS

Alternative embodiments of the invention can be implemented in several applications (e.g., Internet appliances, consumer electronics, computers, communication systems, control systems, and so forth). The particular application may result in a significantly different configuration than the configurations illustrated below. However, the advantages of the embodiments of the invention described below also apply to these other applications. Furthermore, while the discussion of more preferred embodiments is directed to a data processing system including one or more processors chosen from many possible types of processors (e.g., a microprocessor, a micro-controller, a central processor, and so forth), alternative embodiments of the invention can be implemented in clocked analog circuits and systems that do not include processors or digital circuits.

Figure 1:
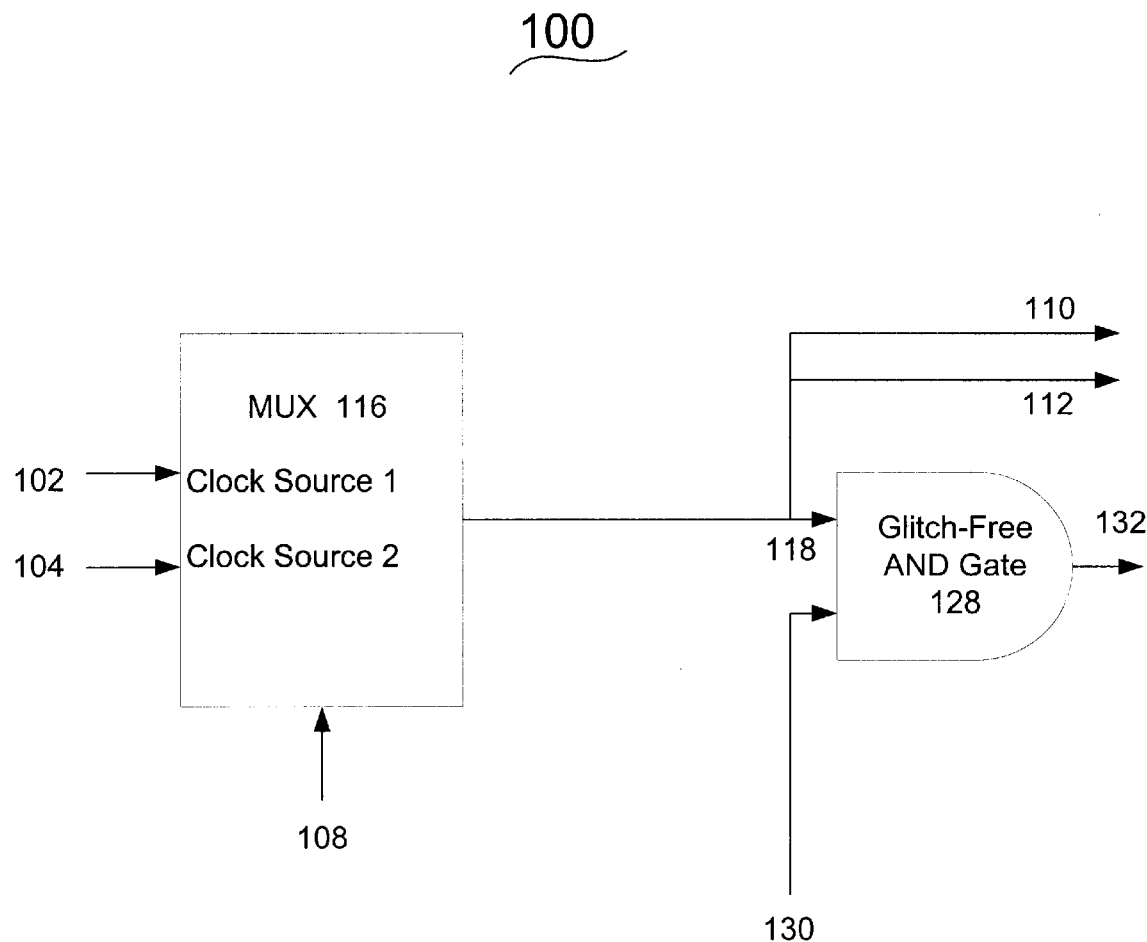
FIG. 1 is a circuit diagram of a clock structure, which illustrates two conventional methods to provide a low power consumption state.
Figure 2:
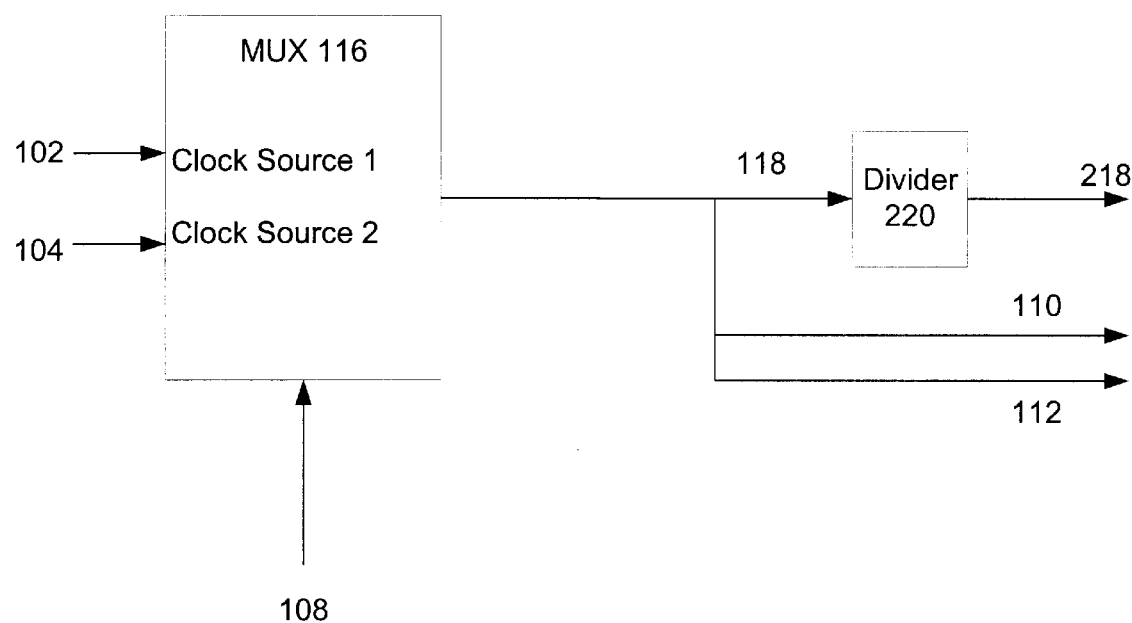
FIG. 2 is a circuit diagram of a data processing system clock circuit according to one preferred embodiment of the invention.

FIG. 2 is a circuit diagram of a data processing system clock circuit 200 according to one preferred embodiment of the invention. The clock circuit 200 is comprised of a multiplexer (MUX) 116, and a core clock divider 220. The MUX 116 receives clock source 1 102 and clock source 2 104. MUX 116, based on a select signal 108, chooses either clock source 1 102 or clock source 2 104 to produce a system clock 118. System clock 118 is optionally tapped to provide a clock for peripheral devices (e.g., a timer clock 110 and an analog-to-digital converter clock 112). Core clock divider 220 receives the system clock 118 and outputs a core clock 218.

Figure 3:
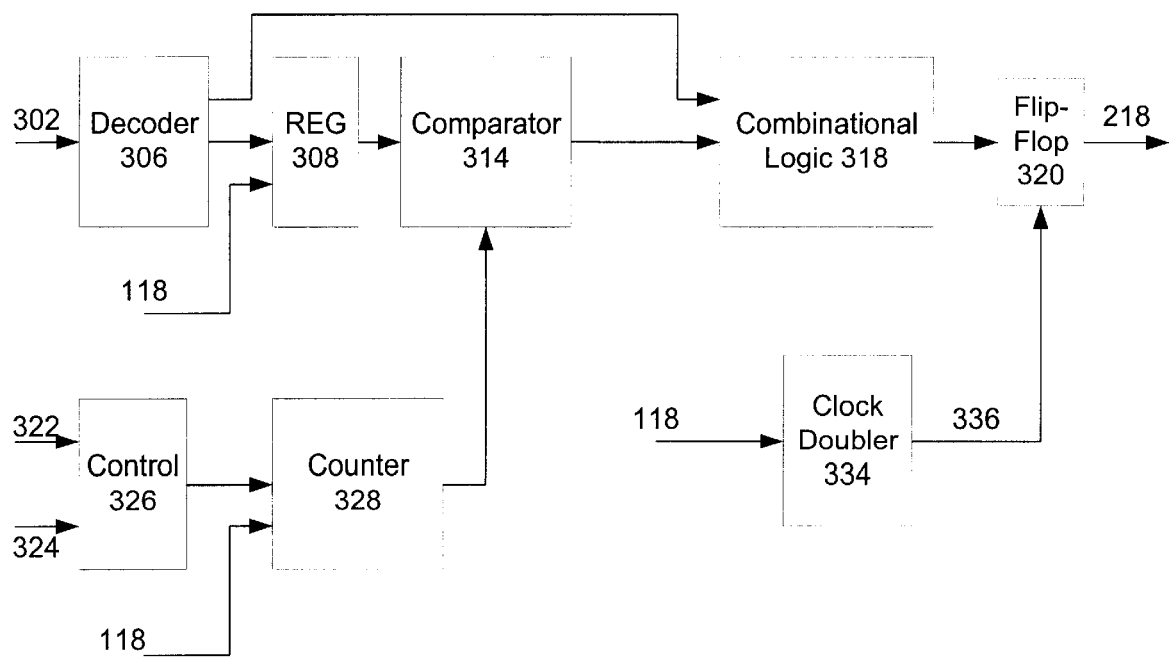
FIG. 3 is a more detailed circuit diagram of a core clock divider in FIG. 2, according to one preferred embodiment of the invention.

FIG. 3 is a more detailed circuit diagram of the core clock divider 220 in shown in the clock circuit of FIG. 2, according to one preferred embodiment of the invention. The core clock divider 220 is comprised of a decoder 306, a register (REG) 308, a comparator 314, a combinational logic circuit 318; a flip-flop 320, a control circuit 326, a counter 328, and a clock doubling circuit 334. The decoder 306 receives a core divider value 302 (typically an integer value), and outputs a signal to register 308 and combinational logic circuit 318. Register 308 outputs a signal to the comparator 314. Control circuit 326 receives "load internal speed" signal 322 and "load core speed" signal 324, and outputs a signal to counter 328. Control circuit 326 generates a load signal for the counter 328. When the counter 328 reaches the maximum count, the counter 328 is stopped. A selector inside the control circuit 326 selects the value to be loaded in the counter 328. Counter 328 also receives system clock 118 as an input signal, and outputs a signal to comparator 314. Comparator 314 outputs a signal to combinational logic circuit 318, which also receives an input signal from the decoder 306. Combinational logic circuit outputs a signal to flip-flop 320. Combinational logic circuit 318 consists of standard OR gates, AND gates, and inverter gates. Clock doubling circuit 334 receives system clock 118, and outputs a new clock signal at twice the frequency to flip-flop 320. Flip-flop 320 outputs a signal that is the core clock 218 produced by the core clock divider 220 shown in FIG. 2.

Figure 4:
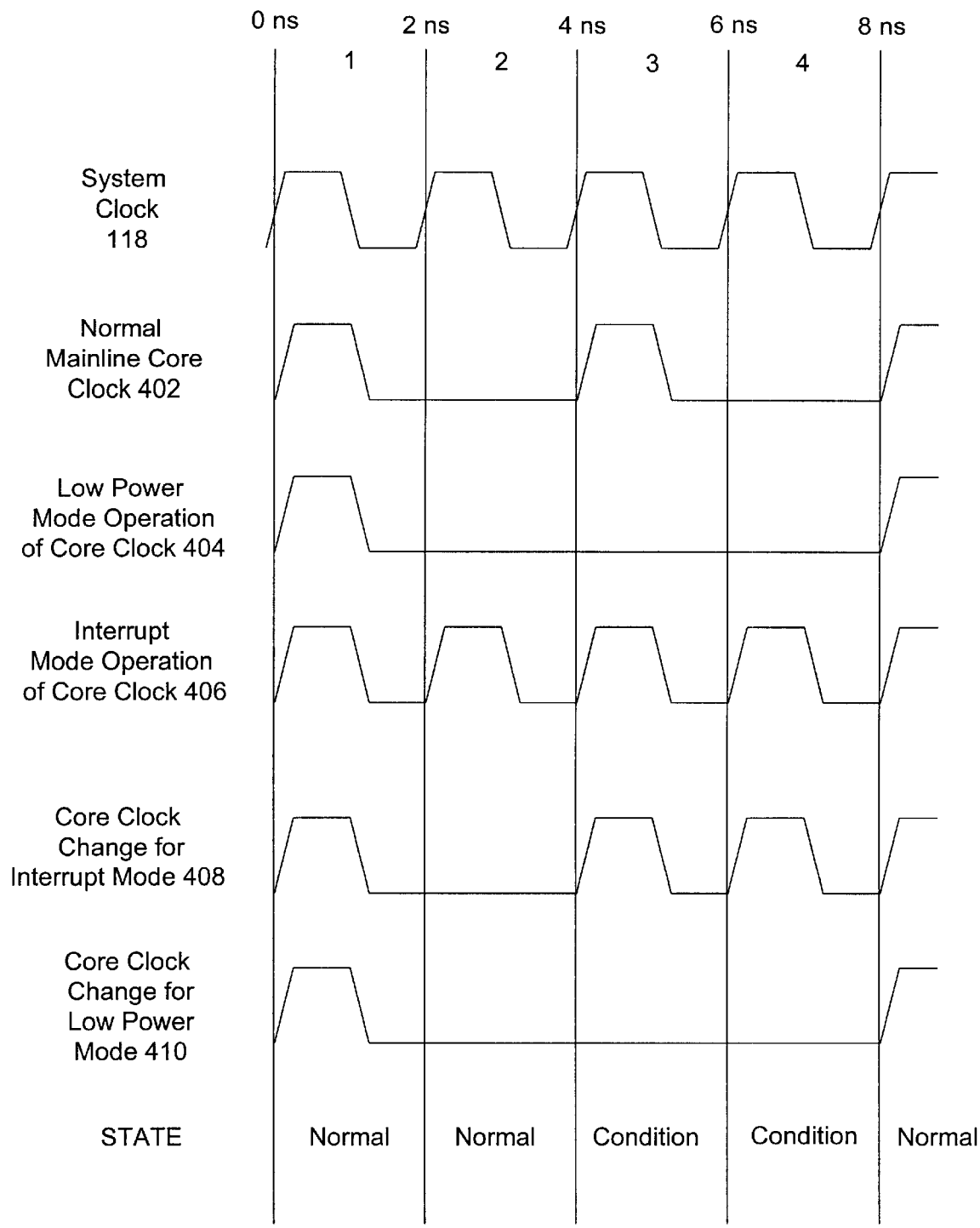
FIG. 4 illustrates a timing diagram comparison of the various clock frequencies and the manner in which the clock frequencies change, according to one preferred embodiment of the invention shown in FIG. 3.

FIG. 4 illustrates a timing diagram comparison 400 of the various clock frequencies and the manner in which the clock frequencies change, according to one preferred embodiment of the invention shown in FIG. 3. The clock frequency of system clock 118 is shown. In this example the normal mainline core clock 402 operates at half the clock frequency as the clock frequency of system clock 118 (in this example the core clock divider 220 reduces the clock frequency by a factor of two), but the mainline core clock frequency could be any integer fraction of the clock frequency of the system clock 118. The low power mode operation core clock 404 has a much lower clock frequency, here shown as having twice the period and half the frequency of the normal mainline core clock 402. The interrupt mode operation core clock 406 has half the period and twice the frequency of the normal mainline core clock 402. The core clock change for an interrupt mode 408 lasting for two condition cycles (periods 3 and 4) shows a transition from the normal mainline core clock frequency to the interrupt mode clock frequency, and back again to the normal mainline core clock frequency. The transition shown at the 4 nanosecond boundary is immediate, and is not dependent on the clock frequency of the slower previous clock. The core clock change for a low power mode 410 lasting for two condition cycles (periods 3 and 4) shows a transition from the normal mainline core clock frequency to the low power mode clock frequency, and back again to the normal mainline core clock frequency. In the more preferred embodiments of the invention, the return to a previous core clock frequency is configurable.

Figure 5:
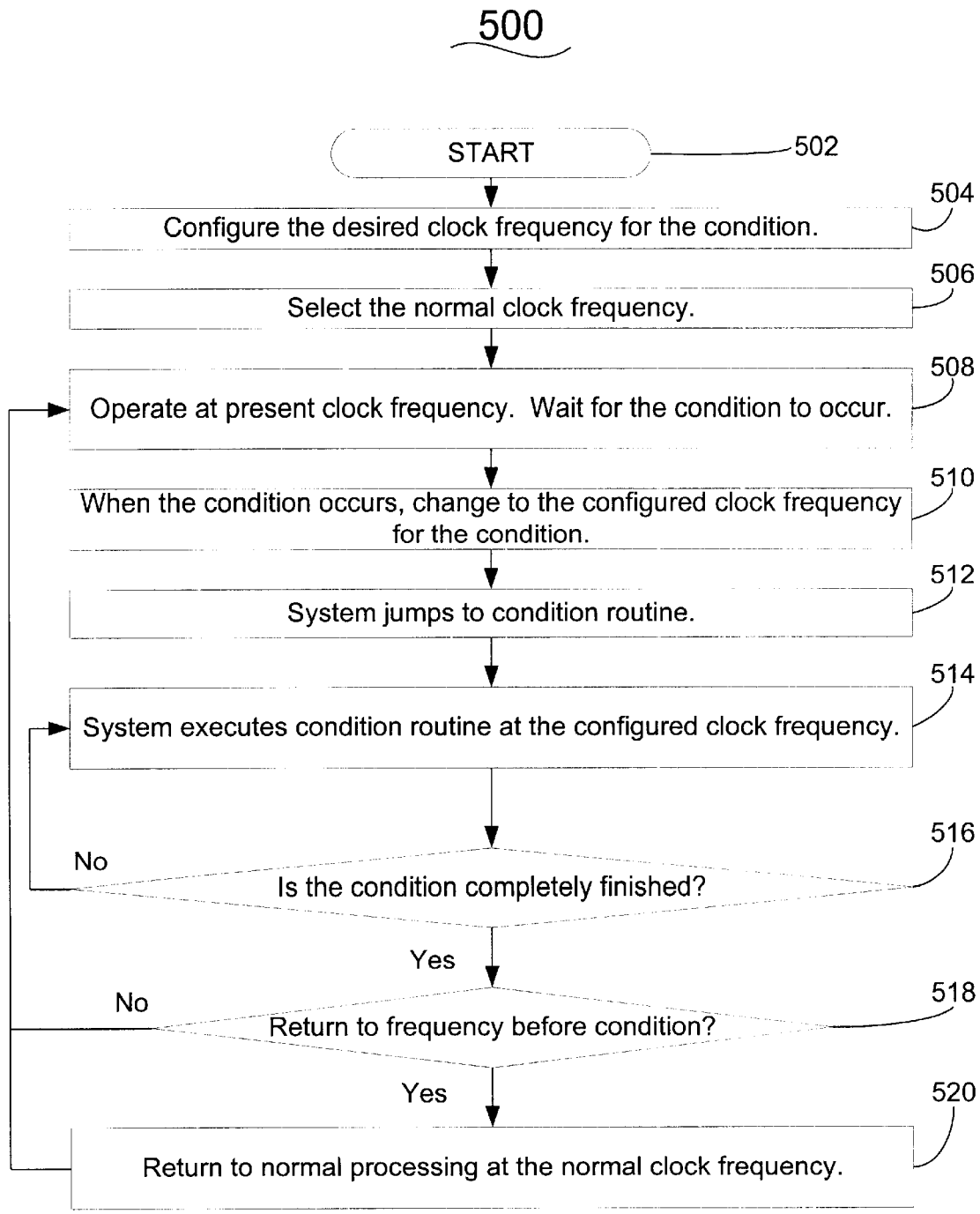
FIG. 5 illustrates a flow chart for a method of operating a data processing system, according to one preferred embodiment of the invention.

FIG. 5 illustrates a flow chart 500 for a method of operating a data processing system, according to one preferred embodiment of the invention. The method starts in operation 502. Operation 504 is next, where the desired processing clock frequency for the condition is configured. Operation 506 is next, where the normal clock frequency is selected, which will be the normal clock frequency in the data processing system. Operation 508 is next, where the data processing system operates at the normal clock frequency and waits for the condition to occur. When the condition occurs, operation 510 is next, where the data processing system changes the clock frequency to the configured clock frequency to handle the condition. Operation 512 is next, where the data processing system jumps to the condition service routine. Operation 514 is next, where the data processing system executes the instructions in the condition service routine at the configured clock frequency. Operation 516 is next, where a test is made to determine if the data processing system is completely finished executing the instructions for the condition, or merely executing one of a series of operations within the condition service routine, or a series of calls (i.e., jumps) to the condition service routine. If the test of operation 516 determines that the interrupt is not completely finished, then operation 514 is repeated. If the test of operation 516 determines that the condition is completely finished, then operation 518 is next, where a test is made to determine if the original clock frequency is to be re-established. If no clock frequency change is needed, then operation 508 is next. If the test of operation 518 determines that the clock frequency should be returned to the original clock frequency, then operation 520 is next, where the original clock frequency is restored. Then operation 508 is next.

Figure 6:
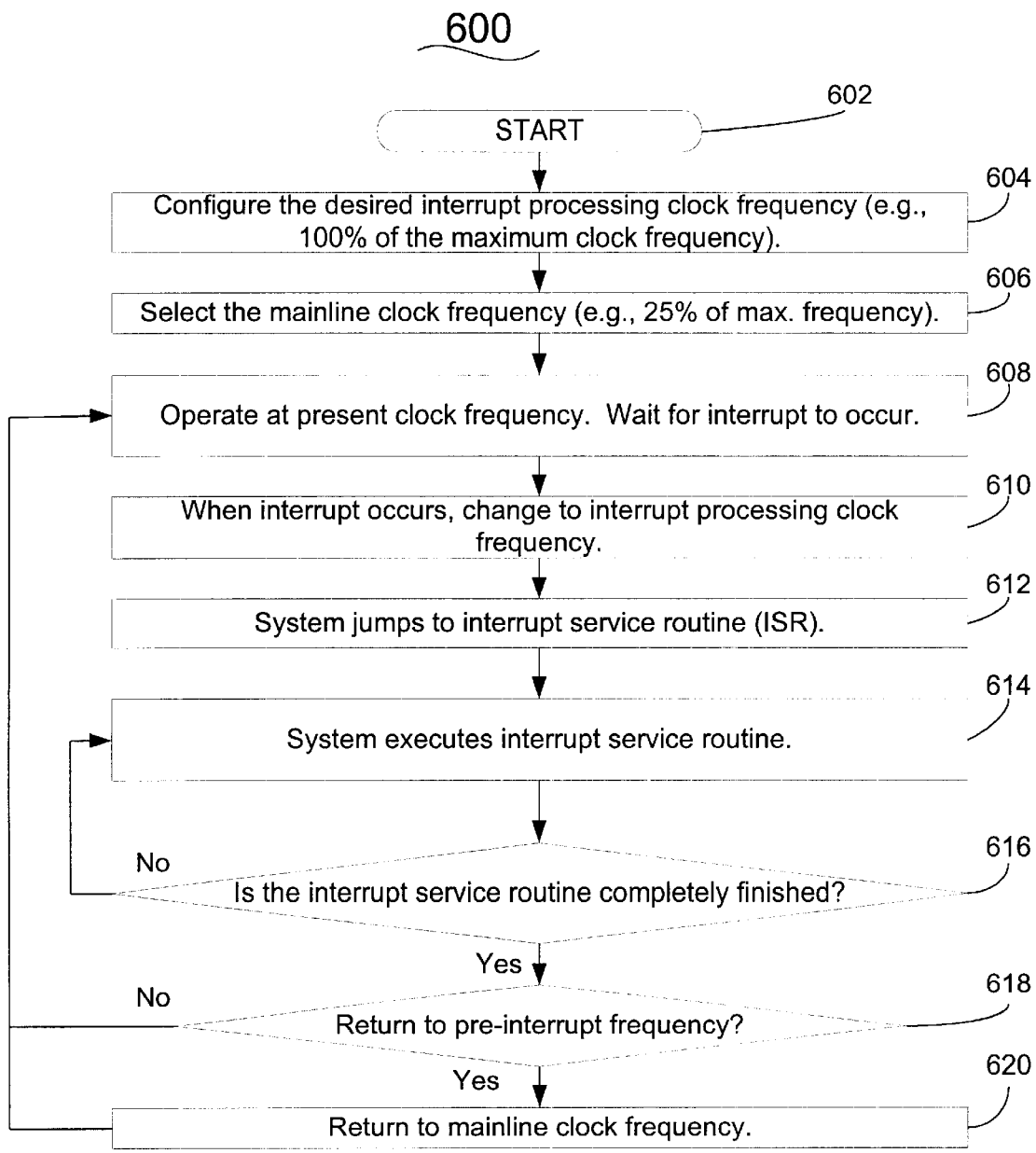
FIG. 6 illustrates a flow chart for a method of operating a data processing system to handle interrupts, according to one preferred embodiment of the invention.

FIG. 6 illustrates a flow chart 600 for a method of operating a data processing system to handle interrupts, according to one preferred embodiment of the invention. The method starts in operation 602. Operation 604 is next, where the desired interrupt processing clock frequency is configured, which is normally the maximum clock frequency available. Operation 606 is next, where the mainline clock frequency is selected, which may be a low clock frequency to reduce power consumption in the data processing system. Operation 608 is next, where the data processing system operates at the mainline clock frequency and waits for an interrupt to occur. When an interrupt occurs, operation 610 is next, where the data processing system changes the clock frequency to the configured clock frequency. Operation 612 is next, where the data processing system jumps to the interrupt service routine (ISR). Operation 614 is next, where the data processing system executes the instructions in the ISR. Operation 616 is next, where a test is made to determine if the data processing system is completely finished executing the ISR, or merely executing one of a series of operations within the ISR, or a series of calls to the ISR. If the test of operation 616 determines that the interrupt is not completely finished, then operation 614 is repeated. If the test of operation 616 determines that the condition is completely finished, then operation 618 is next, where a test is made to determine if the original clock frequency is to be re-established. If no clock frequency change is needed, then operation 608 is next. If the test of operation 618 determines that the clock frequency should be returned to the original clock frequency, then operation 620 is next, where the original clock frequency is restored. Then operation 608 is next.

Figure 7:
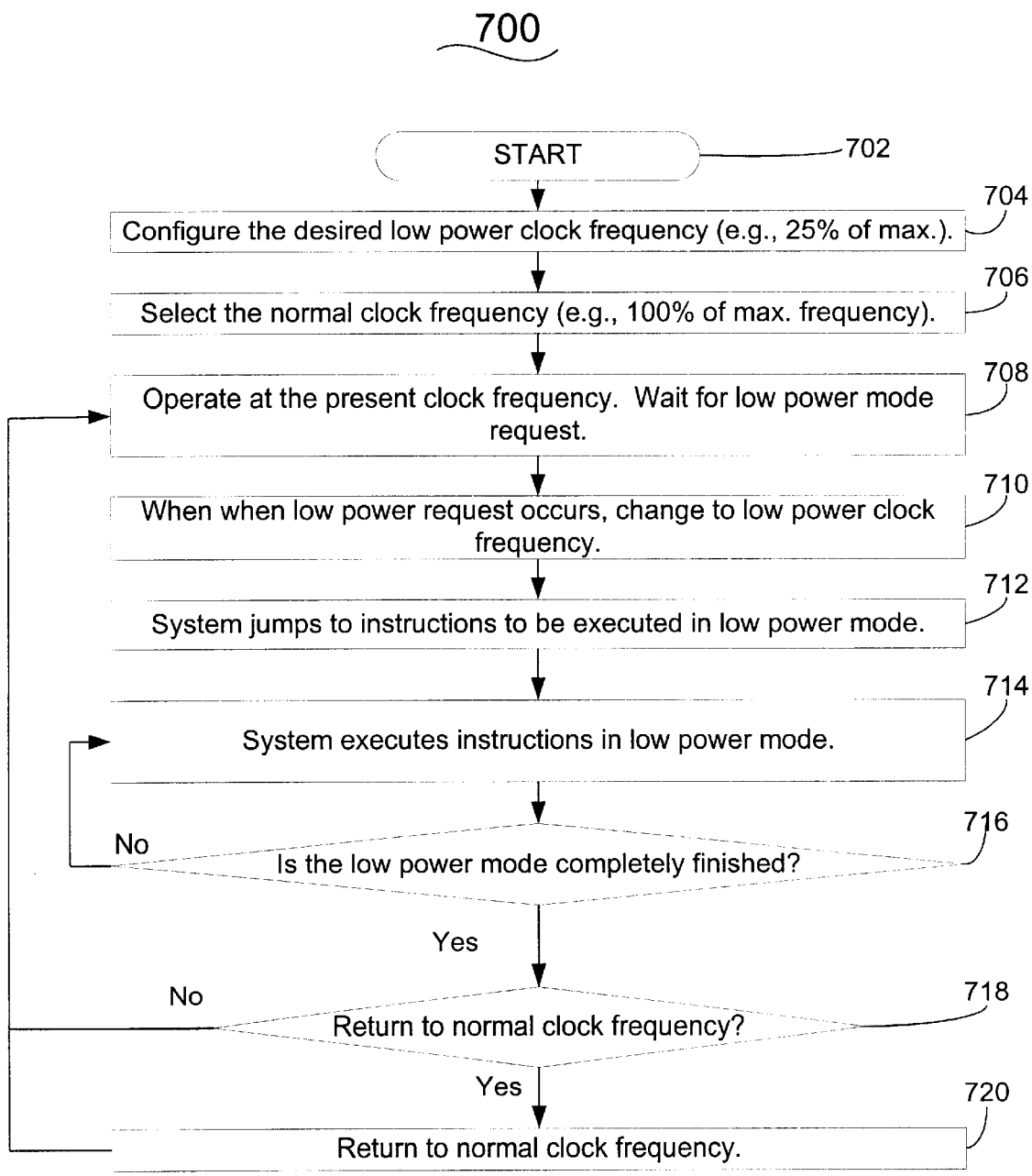
FIG. 7 illustrates a flow chart for a method of operating a data processing system in a low power, mode according to one preferred embodiment of the invention.

FIG. 7 illustrates a flow chart 700 for a method of operating a data processing system in a low power mode, according to one preferred embodiment of the invention. The method starts in operation 702. Operation 704 is next, where the desired low power mode processing clock frequency is configured, which is much less than the maximum clock frequency available. Operation 706 is next, where the normal clock frequency is selected, and is typically much higher than the configured clock frequency for the low power mode in the data processing system. Operation 708 is next, where the data processing system operates at the normal clock frequency and waits for a low power mode request to occur. When the low power mode request occurs, operation 710 is next, where the data processing system changes the clock frequency to the configured clock frequency. Operation 712 is next, where the data processing system jumps to the low power service routine. Operation 714 is next, where the data processing system executes the instructions in the low power service routine. Operation 716 is next, where a test is made to determine if the data processing system is completely finished executing in the low power mode, or merely executing one of a series of operations within the low power mode service routine, or a series of calls to the low power mode service routine. If the test of operation 716 determines that the interrupt is not completely finished, then operation 714 is repeated. If the test of operation 716 determines that the condition is completely finished, then operation 718 is next, where a test is made to determine if the original clock frequency is to be re-established. If no clock frequency change is needed, then operation 708 is next. If the test of operation 718 determines that there should be a return to the original clock frequency, then operation 720 is next, where the restoration occurs. Operation 708 is next.

Figure 8:
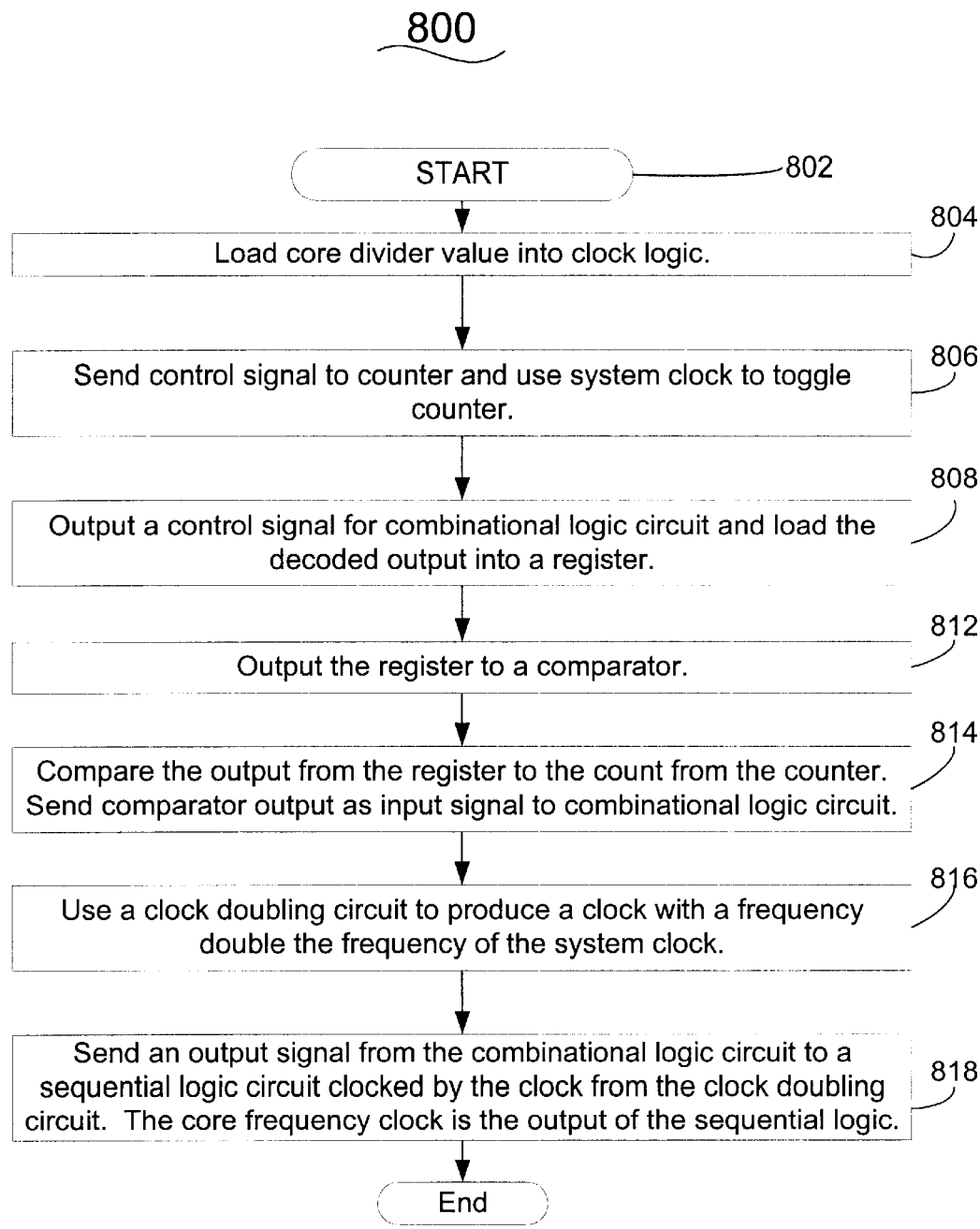
FIG. 8 illustrates a flow chart for a method of operating a data processing system with a clock divider shown in FIG. 3, according to one preferred embodiment of the invention.

FIG. 8 illustrates a flow chart 800 for a method of operating a data processing system with a clock divider shown in FIG. 3, according to one preferred embodiment of the invention. The method starts in operation 802. Operation 804 is next, where processor instructions load the core clock divider value into the clock control logic. Operation 806 is next, where a control signal is sent to the counter that uses the system clock to toggle the counter. Operation 808 is next, where a decoder outputs a control signal for a combination logic circuit, and the decoder output is loaded into a register. Operation 812 is next, where the register outputs a signal to a comparator. Operation 814 is next, where the comparator compares the output from the register to the count received from the counter. The comparator outputs a signal received as an input by the combinational logic circuit. Operation 816 is next, where a clock doubling circuit receives the system clock and produces a clock output with a clock frequency double the system clock frequency. Operation 818 is next, where the combinational logic circuit outputs a signal to a sequential logic circuit (e.g., a flip-flop, a latch, or an equivalent) clocked by the clock from the clock doubling circuit. The sequential logic circuit outputs the core frequency clock used by the processor. The method ends in operation 820.

Another preferred embodiment automatically changes the clock frequency during memory access, according to a memory map indicating which memory is relatively slow (e.g., flash memory) or relatively fast (e.g., static RAM, and other types of volatile memory). This permits slower or faster memory access by address, without needing wait states in the processor instructions.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method to deterministically change a clock frequency between a first clock frequency and a second clock frequency in a data processing system to process operations upon the occurrence of a condition, comprising:

configuring said first clock frequency to be used when processing operations in said data processing system when said condition is occurring;

configuring said second clock frequency to be used when processing operations in said data processing system when said condition has not occurred; and changing said clock frequency to said first clock frequency to process said condition when said condition occurs.

2. The method of claim 1, further comprising:

returning said clock frequency to said second clock frequency in said data processing system when said condition has been processed.

3. The method of claim 1, further comprising:

jumping to a condition service routine; and executing said condition service routine at said first clock frequency, wherein said clock frequency is a processor clock frequency.

4. The method of claim 1, wherein changing said clock frequency to said first clock frequency occurs with a delay independent of said second clock frequency.

5. The method of claim 1, wherein changing said clock frequency to said second clock frequency occurs within one clock cycle of said clock frequency.

6. The method of claim 1, wherein said first clock frequency and said second clock frequency are each an integer division of a common clock frequency.

7. The method of claim 1, wherein said condition includes an interrupt to said data processing system.

8. The method of claim 1, wherein said condition includes an interrupt to said data processing system, and said first clock frequency is greater than said second clock frequency.

9. The method of claim 1, wherein said condition includes operating said data processing system in a low power consumption state.

10. The method of claim 1, wherein said condition includes operating said data processing system in a low power consumption state, and said first clock frequency is less than said second clock frequency.

11. The method of claim 1, wherein said data processing system includes a memory, and uses said first clock frequency to access a relatively slow first portion of memory, and uses said second clock frequency to access a relatively fast second portion of memory.

12. The method of claim 11, wherein said second portion of said memory includes volatile memory, and said first portion of said memory includes non-volatile memory.

13. The method of claim 11, wherein a memory map is used to select between said first clock frequency and said second clock frequency during access to said memory.

14. A method to change the clock frequency of a data processing system to process operations upon the occurrence of a condition, comprising:

configuring a first clock frequency to said clock frequency to process said condition in said data processing system when said condition is occurring;

configuring a second clock frequency to said clock frequency to process operations in said data processing system when said condition has not occurred;

changing said clock frequency to said first clock frequency within one clock cycle of said clock frequency to process said condition when said condition occurs;

jumping to a condition service routine;

executing said condition service routine at said first clock frequency; and testing for completion of said condition service routine.

15. The method of claim 14, further comprising:

returning said clock frequency to said second clock frequency in said data processing system after said completion of said condition service routine.

16. The method of claim 14, wherein said condition includes an interrupt to said data processing system, and said first clock frequency is greater than said second clock frequency.

17. The method of claim 14, wherein said data processing system includes a memory, and uses said first clock frequency to access a relatively slow first portion of memory, and uses said second clock frequency to access a relatively fast second portion of memory.

18. The method of claim 17, wherein said second portion of said memory includes volatile memory, and said first portion of said memory includes non-volatile memory.

19. The method of claim 17, wherein a memory map is used to select between said first clock frequency and said second clock frequency during access to said memory.

20. A clock divider circuit to produce a core clock signal, comprising:
- a decoder, receiving a core clock divider value input and producing a first and second output signal;
- a register receiving said first output signal from said decoder and producing an output signal;
- a control circuit receiving a plurality of inputs signals and producing an output signal;
- a counter receiving said output signal from said control circuit and producing an output signal;
- a comparator receiving said output from said register and said output signal from said counter and producing an output signal;
- a combinational logic circuit receiving said second output signal from said decoder and said output signal from said comparator;
- a clock doubling circuit receiving a clock input signal and producing a clock output signal; and
- a sequential logic circuit receiving said output signal from said combinational logic circuit and said output signal from said clock doubling circuit and producing said core clock signal.

21. The data processing system circuit of claim 20, wherein said sequential logic circuit is a flip-flop clocked by said output signal from said clock doubling circuit.

22. A data processing system with a deterministically variable processor clock, comprising:
- a processor receiving said determininistically variable processor clock;
- a memory accessible to said processor, containing information to be used by said processor, having a first portion with a relatively faster access and a second portion with a relatively slower access; and
- a clock structure to change said variable processor clock supplied to said processor from a first clock frequency to a second clock frequency.

23. The data processing system of claim 22, wherein said processor is a processor chosen from the group of processors consisting of: a micro-controller, a microprocessor, and a central processing unit.

24. The data processing system of claim 22, wherein said clock structure comprises a clock divider.

25. The data processing system of claim 24, wherein said clock divider comprises a decoder.

26. The data processing system of claim 25, wherein said clock divider further comprises:
- a control logic circuit producing an output signal to control a counter, said counter producing an output signal and receiving said output signal from said control logic circuit;
- a register producing an output signal and receiving said output signal from said decoder; and
- a comparator receiving said output signal from said register and said output signal from said counter.

27. The data processing system of claim 26, wherein said clock divider further comprises:
- a combinational logic circuit producing an output signal and receiving said output signal from said decoder and said comparator;
- a clock doubling circuit producing an output clock signal and receiving a system clock signal; and
- a sequential circuit producing said variable processor clock and receiving said output signal from said combinational logic circuit and said output clock signal from said clock doubling circuit.

28. The data processing system of claim 27, wherein said processor uses said first clock frequency to access said first portion of said memory and uses said second clock frequency to access said second portion of said memory.

29. The data processing system of claim 28, wherein said first portion of said memory includes volatile memory, and said second portion of said memory includes non-volatile memory.

30. The data processing system of claim 28, wherein a memory map is used to select between said first clock frequency and said second clock frequency to control said processor during access to said memory.

* * * * *